(No Model.)

A. C. ESTABROOK.
DEVICE FOR MAKING COVERED EYELETS.

No. 568,940. Patented Oct. 6, 1896.

Witnesses
Oscar F. Hill.
Robert Wallace

Inventor
Hanson C. Estabrook
By Macleod Calver & Randall
his Attorneys

UNITED STATES PATENT OFFICE.

ALANSON C. ESTABROOK, OF NORTHAMPTON, MASSACHUSETTS.

DEVICE FOR MAKING COVERED EYELETS.

SPECIFICATION forming part of Letters Patent No. 568,940, dated October 6, 1896.

Application filed December 18, 1895. Serial No. 572,504. (No model.)

*To all whom it may concern:*

Be it known that I, ALANSON C. ESTABROOK, a citizen of the United States, residing at Northampton, in the county of Hampshire and State of Massachusetts, have invented certain new and useful Improvements in Devices for Making Covered Eyelets, of which the following is a specification, reference being had therein to the accompanying drawings.

The invention will be described first with reference to the accompanying drawings, after which the distinguishing characteristics thereof will be particularly pointed out and distinctly defined in the claims at the close of this specification.

Figure 1:
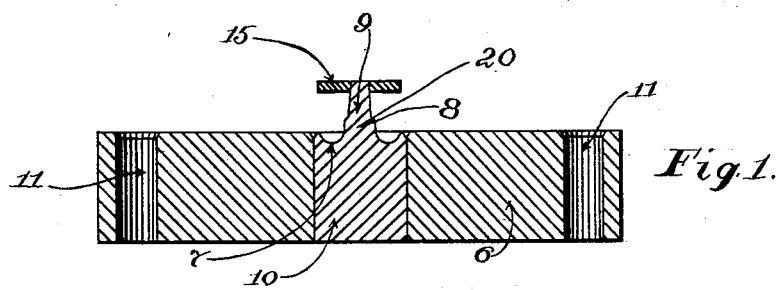
Figure 2:
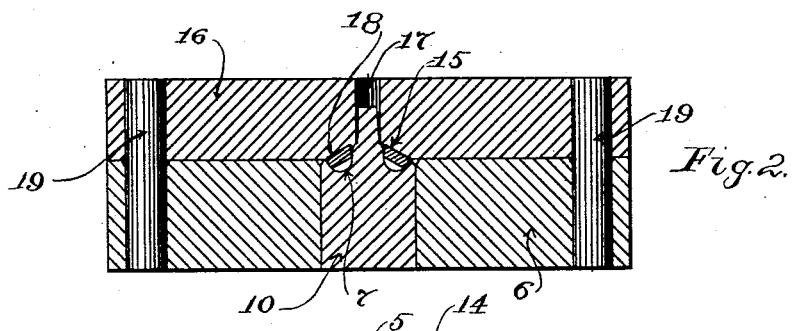
Figure 3:
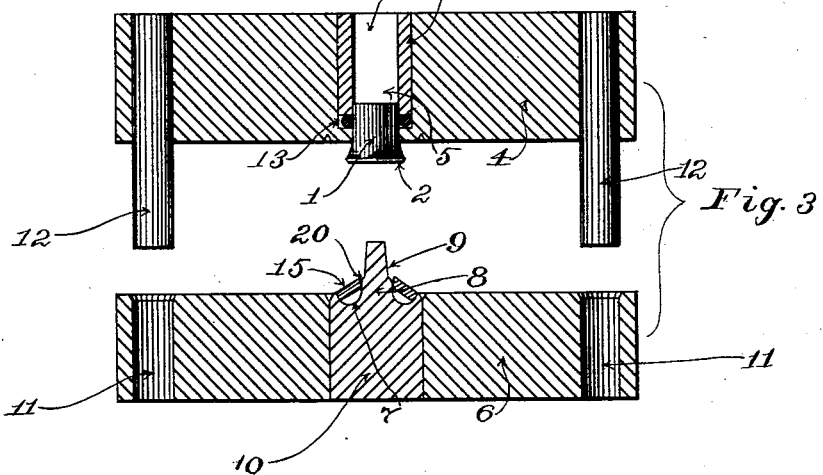
Figure 4:
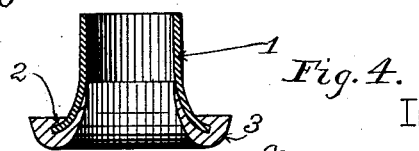

Figure 1 of the drawings is a view in transverse section of one of the mold-plates or die-plates which are employed in the manufacture of covered eyelets, the said figure showing a washer of plastic material applied to the upper end of the central pin of the die and illustrating one portion of my present invention. Fig. 2 is a view in similar section illustrating the same mold-plate or die-plate, and also showing applied thereto the heater-plate, which is described hereinafter, this view representing both of the features of the invention. Fig. 3 is a view in similar section illustrating both of the mold-plates or die-plates which are employed in the manufacture of covered eyelets and showing them separated, but in position for being brought together to effect the molding of a head or covering upon an eyelet. Fig. 4 shows in vertical transverse section a covered eyelet.

1, Figs. 3 and 4, is the metal body of an eyelet. 2, in the same figures, is the flange thereof.

3, Fig. 4, is the head or covering of plastic material, which is molded upon the said flange.

Heretofore in the manufacture of covered eyelets like that which is shown in Fig. 4 there has been employed for the purpose of molding heads or coverings 3, of plastic material, upon the flanged ends of the metal bodies of the eyelets a pair of mold-plates or die-plates, such as those which are shown in position about to be brought together in Fig. 3, one of the said mold-plates or die-plates, namely, that designated 6, being shown separately in Fig. 1, and being shown with the heater-plate 16 applied thereto in Fig. 2. The other of the said plates, namely, that designated 4 in Fig. 3, is formed with a hole 5 for the reception of the barrel portion of an eyelet, while the other plate, namely, that designated 6 in each of Figs. 1, 2, and 3, is formed or provided with a circular recess or depression 7, the latter corresponding in conformation with the head or covering 3, which is to be molded upon each eyelet. For the purpose of molding properly the inner portions of the said head or covering 3, more particularly the portion thereof within the throat of the eyelet, the portion 8, which is at the center of the circular recess or depression 7, is raised and continued in the form of a pin 9, which latter, when the two mold-plates or die-plates are brought together in the operation of molding the head or covering 3 upon an eyelet, passes into the barrel of the eyelet. This pin determines the extent of the flow of the plastic material into the throat of the eyelet and the form of the portion of the head or covering which enters such throat. For convenience in the production of the molding devices the circular recess 7, raised portion 8, and pin 9 are embodied in a cylindrical die 10, of properly-hardened material, which is inserted into a hole that is made through the plate 6. The said plate 6 is provided at its ends with holes 11 11, as usual, and the plate 4 is provided with the usual steady-pins 12 12. When the plates are brought together at the time of performing the molding, the steady-pins 12 12 pass into the holes 11 11 and thereby cause the parts which are concerned in the molding to register properly with each other.

For the purpose of holding the eyelet in the hole 5, after having been inserted into the same prior to the molding, a split ring 13, Fig. 3, is or may be employed, this ring being placed in an enlargement of the hole into which the barrel of the eyelet is pushed, and being held in place by a tube 14, as shown in Fig. 3. This split ring forms the subject of the claim in my application for United States Letters Patent filed November 18, 1895, Serial No. 569,292. The employment of this particular means of securing the eyelet in place in the hole of the plate 4 is not essential to the carrying out of my present invention. Any other suitable means of retaining the eyelet in place in the said plate may be employed.

The plastic material of which the heads or coverings 3 are formed is ordinarily a pyroxylin compound. The latter is received from the makers thereof in flat sheets. In a prior application filed by me July 13, 1895, Serial No. 555,865, I have described and claimed a means and method of punching from such sheets small washers, each corresponding in outside diameter with the circular recess 7, and having the central hole thereof of a diameter which permits the washer to be passed down upon the central pin 9 of a mold. Each of such washers contains the amount of material which is used in the formation of the head or covering of an eyelet. The object of punching the material into the form of washers is to enable the material to be handled conveniently and to be employed economically. In application Serial No. 555,865 aforesaid I have illustrated and described the utilization of the pin 9 of the die for the purpose of punching the central hole of the washer. As produced by the punching devices of the said application the washer is left upon the upper end of the pin 9, as indicated at 15 in Fig. 1. I prefer, in the utilization of the present invention in practice, to form and apply the washers to the pin 9 in the manner which has just been described in connection with the reference to the application last mentioned. However, if desired, the washers may be separately punched and afterward applied in any suitable manner; for example, by hand. As noted above, the pin 9 passes into the barrel of the eyelet, which is in process of having a head or covering 3 molded thereon, and determines the extent of the flow of the plastic material into the throat of the eyelet, as well as the form of the portion of the head or covering which enters such throat. To do this properly, the base portion of the said pin must approximately fit against the inner surface of the eyelet. Heretofore the washers that have been used have had the central holes thereof of the same diameter as the base portion of the pin; also, in cases where the pin has been utilized for punching the central holes of the washers the said pin heretofore has been made of the same diameter throughout its full length. Through experience I have ascertained that the best results cannot readily be attained when the hole of the washer is of the same diameter as the base of the pin 9. In such case it frequently happens that the interior portion of the molded covering or head of the finished eyelet is imperfect and exposes the metal. This is due to the failure of the plastic material to flow into the throat of the eyelet around the pin. The amount of material in each washer should be just sufficient to fill the circular recess 7 and the throat of the eyelet for a short distance after the plates 4 and 6 have been compressed together, it being understood that at this time the hole 5 in the former has inserted into the same the body of an eyelet, and the flange of the said eyelet enters the recess 7.

It is desirable to avoid the pressing out of any material over the edge of the die beyond the outer boundary of recess 7, for while such material would be cut off on the closing of the plates 4 and 6 together there would be produced a flash of the stock around the outer edge of the head or covering of the eyelet. There would also in this case occur the loss of a small portion of stock, which it is desirable to avoid. This pressing out of the stock will occur, not only when an excess of material is contained in the washer, but also, even when the washer contains precisely the right amount of material, when the material composing such washer is improperly disposed or located in the circular recess 7 before the performance of the molding operation; that is, when an unduly great proportion thereof becomes located in the portions of the said recess which are the more remote from the center, measured radially.

The material used in the production of the heads or coverings 3 is not perfectly plastic, and even when heated requires some time for its flow. On the other hand, the beginning and end of the compression in the molding of a head or covering 3 upon the metal body of an eyelet occur almost simultaneously, so that the plastic material has but a minimum amount of time in which to flow into all of the interior spaces of the molds. When the mold-plates are brought together and are subjected to compression, it will follow, in case the greater proportion of plastic material is located in the outer portion of recess 7, and because of the tendency of the plastic material to pass most readily in the direction of least resistance, that, instead of the desired portion thereof passing into the closely-contracted space between the base of pin 9 and the interior of the throat of the eyelet, such space will remain partly unfilled, and a corresponding quantity of material will flow outward as excess beyond the outer edge of the recess and be cut off on the complete closing of the dies together. Thus waste will result, a flash will be formed, and the metallic surface in the throat of the eyelet will be partially or completely exposed, all of which are undesirable occurrences.

The object of my present invention is to obviate the foregoing disadvantages and difficulties. To this end, in punching the washers, I form the central hole of each washer somewhat smaller in diameter than the base of the pin 9. This obviously will give an increased amount of material contained in the washer when compared with one having a hole of the full diameter of the base of pin 9, it being assumed that both washers are of the same thickness. I then upset the said washer, so as to render it somewhat dished, or in appearance like a truncated cone. I also expand the central hole, so as to enable it to pass down into place at the base of the pin 9. The shape and position of the washer then are substantially such as are represented in Fig. 2 of the drawings. The upsetting or dishing of the washer and the expanding of the central hole thereof may be effected by the use of various forms of mechanical contrivances.

With the object in view of reducing the number of operations necessary to be performed and the frequency with which the washers are handled I arrange by preference to perform the upsetting or dishing of the washers and the expanding thereof simultaneously with the placing of the washers upon the base of the pin 9 in proper position for the molding. To this end I form the upper end or tip of the pin 9 of reduced diameter relatively to the base thereof, the said tip being small enough to enter the hole of reduced diameter that is made in the washer. The washer may be punched first and then placed upon the tip of the pin, (see Fig. 1,) or the said tip may act to punch the central hole, and in that case the washer will remain thereon after the punching. In order now to effect the upsetting or dishing and the expanding and also drive the washer down into place upon the base of the pin, I use a heater-plate 16, Fig. 2, corresponding in character with the heater-plate of my application, Serial No. 555,865, aforesaid, but differing therefrom in having the lower portion of the hole 17 therethrough flared or countersunk, as at 18, Fig. 2. This heater-plate has steady-pins 19 19 to enter the holes 11 11 through the mold-plate or die-plate 6, as shown in Fig. 2. The hole 17 receives the pin 9, as in the former application, and the heater-plate operates to soften the washer and drive it down upon the pin 9. The softening enables the washer to change its form without cracking or breaking. As the washer passes downward the resistance that is offered to the descent of the portions of the washer which are nearest the center thereof by the portions of the pin which are of greater diameter than the tip of the pin operates to upset or force such portions of the washer upwardly relatively to the remaining portions of the washer, so that the washer is caused to fit and take the shape of the flare or countersink 18. The increased diameter of the lower portion of pin 9 effects the expanding of the central hole of the washer as the washer in its softened condition is forced down.

I form the pin with a shoulder extending around the same at 20. At this shoulder the pin is of a diameter which causes it to practically fill the hole through the metal body 1 of the eyelet. Preferably the upper portion of the pin 9 tapers regularly from the shoulder to or near the extreme end. This shoulder operates to compel the washer to become upset or dished as it is forced along the pin 9 by the heater-plate in case it has not assumed the desired shape before reaching such shoulder, and also completes the expansion of the central hole in the washer. The height of the said shoulder above the surface of plate 6 and the depth of the flare or countersink 18 agree and determine the extent to which the washer is upset or dished.

Fig. 3 shows the heater-plate removed and the upset or dished washer left in place on the base portion of the pin 9. When, now, the plate 4, carrying an eyelet, is brought down against the plate 6, the central portion of the upset or dished washer will pass into the throat of the eyelet and project somewhat into the said throat, as will be understood. This locates the portion of the said washer which is to cover the interior surface of the eyelet at exactly the place where it is needed, so that at the time of the compression it becomes unnecessary to depend upon the flow of the material inwardly from the recess 7 into the throat of the eyelet. Thereby the use of an upset or dished washer locates the plastic material precisely where it is needed for filling the cavities of the molds, reduces to a minimum the extent to which the softened material has to flow in order to fill the molds properly, and secures without waste a result which could be only imperfectly accomplished by the use of a thicker flat washer, and in the latter case with the accompaniment of considerable waste.

I claim as my invention—

1. The improved method of producing covered eyelets, which consists in first forming a washer of the covering material with the hole therethrough smaller than the hole through the eyelet that is to be covered, then upsetting or dishing the said washer to give it the shape of a truncated cone, and expanding the central hole thereof, then applying the eyelet and washer to each other with the truncated end of the cone within the throat of the eyelet, and then subjecting the two to compression to mold the covering upon the end and within the throat of the eyelet, substantially as described.

2. The mold for making covered eyelets, having the circular recess 7 to form the outer portion of the molded head or covering, and also having the pin 9 formed with a tip of reduced diameter relatively to the base portion thereof, which latter fits within the throat of the eyelet and assists in the molding operation, substantially as described.

3. The mold for making covered eyelets, having the circular recess 7 to form the outer portion of the molded head or covering, and also having the pin 9 formed with a tip of reduced diameter relatively to the base portion thereof, which latter fits within the throat of the eyelet and assists in the molding operation, and having the shoulder 20 at the upper part of the said base portion, substantially as described.

4. The mold for making covered eyelets, having the circular recess 7 to form the outer portion of the molded head or covering and also having the pin 9 formed with a tip of reduced diameter relatively to the base portion thereof, which latter fits within the throat of the eyelet and assists in the molding operation, combined with the heater-plate perforated to fit upon pin 9, and also having the lower portion of the perforation therethrough flared or countersunk as at 18, substantially as described.

5. The mold for making covered eyelets, having the circular recess 7 to form the outer portion of the molded head or covering, and also having the pin 9 formed with a tip of reduced diameter relatively to the base portion thereof, which latter fits within the throat of the eyelet and assists in the molding operation, and having the shoulder 20 at the upper part of the said base portion, combined with the heater-plate perforated to fit upon pin 9, and also having the lower portion of the perforation therethrough flared or countersunk as at 18, substantially as described.

In testimony whereof I affix my signature in presence of two witnesses.

ALANSON C. ESTABROOK.

Witnesses:
    FRANK N. LOOK,
    JANET L. ELLIOT.